United States Patent
Jamison, Jr. et al.

(10) Patent No.: US 10,345,682 B1
(45) Date of Patent: Jul. 9, 2019

(54) VARIABLE DIAMETER MOUNTING ATTACHMENT

(71) Applicant: Panavision International, L.P., Woodland Hills, CA (US)

(72) Inventors: Richard L. Jamison, Jr., Simi Valley, CA (US); Trach Nguyen, Sylmar, CA (US); Scott Macdonald, Simi Valley, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 15/954,191

(22) Filed: Apr. 16, 2018

(51) Int. Cl.
*G03B 17/56* (2006.01)
*F16B 2/10* (2006.01)
*G03B 11/04* (2006.01)

(52) U.S. Cl.
CPC .............. *G03B 17/566* (2013.01); *F16B 2/10* (2013.01); *G03B 11/045* (2013.01)

(58) Field of Classification Search
CPC ........................................................ F16B 2/10
USPC ............................................................ 396/529
See application file for complete search history.

(56) References Cited

U.S. PATENT DOCUMENTS

| 2,510,374 A * | 6/1950 | Brady ................ H04N 5/222 348/184 |
| 2,926,587 A * | 3/1960 | Gebele ................ G03B 3/02 396/460 |
| 2012/0057859 A1* | 3/2012 | Byon ................ G03B 9/06 396/510 |

\* cited by examiner

*Primary Examiner* — Clayton E. LaBalle
*Assistant Examiner* — Linda B Smith
(74) *Attorney, Agent, or Firm* — Rogowski Law LLC

(57) ABSTRACT

A variable diameter mounting attachment joins an accessory, such as a matte box, to a lens of a camera, such as a video camera, digital camera or broadcast camera, while blocking undesired light from reaching the lens. The attachment incorporates two synchronized mechanisms activated together by rotation of an outer gear ring: (1) a series of jaws to clench an outer edge of the lens housing, and (2) a multiple blade iris diaphragm to block undesired light from entering the lens. A lock lever clamps the outer gear ring in fixed position.

24 Claims, 11 Drawing Sheets

VARIABLE DIAMETER MOUNTING ATTACHMENT

BACKGROUND OF THE INVENTION

The present invention is generally directed to an attachment incorporating two synchronized mechanisms: one to securely clamp the device to the exterior of a camera lens and one to block unwanted light from traveling through the device to impact the lens.

Camera lenses are available with different diameters. When a matte box or other camera accessory is mounted to the front of a lens, it is necessary to use a lens-specific adapter clamp to make the mounting connection. Due to the large number of different lenses with differing diameters, photographers and videographers often have multiple matte boxes or multiple other accessories with fixed diameters to mate to each lens uniquely.

One existing solution to this problem is to maintain a collection of adapter rings or plates of different internal diameters that are adapted to fit to lenses of different outer diameters. An oversized clamp is used in combination with a selected adapter ring or plate. With these multiple connection elements, it is inconvenient and time-consuming to change from one lens to another. Moreover, the photographer or videographer must keep a collection of differently sized adapter rings and plates, and still may not have the appropriate sized adapter ring or plate for a desired lens. As a result, the accessory is not securely mounted to the lens and stray light may pass through the accessory at the connection location of the adapter ring or plate, impacting the photographic or video image, such as by glare or lens flare.

Therefore, improvements to means for mounting accessories onto a variety of lenses for still photography, video, broadcast, movie and security cameras continue to be sought. In particular, the industry seeks a universal adapter mechanism that would provide a quick and tool-less way to attach accessories to a variety of lenses that are not necessarily the same type or size.

BRIEF SUMMARY OF THE INVENTION

Briefly stated, one aspect of the present invention is a mounting attachment for a camera lens to attach an accessory, such as a matte box or ring light, to the lens. The mounting attachment in one embodiment includes a series of two or more iris diaphragm jaws, preferably three or more iris diaphragm jaws, with each jaw having a curved shape with a first end and a second end and a stepped top surface and a bottom surface opposite the stepped top surface. The diaphragm jaws are arranged in overlapping relation to form a circular array. Each diaphragm jaw has a first pin extending from its top surface at or near the first end of the diaphragm jaw and a second pin extending from its opposite surface at or near the second end. In one advantageous embodiment, each of the iris diaphragm jaws has an inner curved edge with a raised rim configured to provide a flange for attachment to seat against the housing of the camera lens. The iris diaphragm jaws join the attachment the housing of the camera lens. The raised rim may comprise rubber or an elastomeric material. Preferably, a portion of the bottom surface of a first iris diaphragm jaw slidably contacts a portion of the stepped top surface of a second iris diaphragm jaw. Preferably, at least the top surfaces and opposite surfaces of the iris diaphragm jaws are coated with a friction reducing composition.

A first ring is at the front of the mounting attachment. The first ring has a top surface and an opposite surface, with its top surface adjacent to at least a portion of the stepped top surfaces of the diaphragm jaws. The first ring defines holes therethrough or recesses therein each configured to receive a respective one of the first pins of the diaphragm jaws.

A multiple blade iris diaphragm also is included in the mounting attachment. Each of the blades of the multiple blade iris diaphragm has a curved shape with a first end and a second end and a top surface and an opposite surface. The blades are arranged in overlapping relation to form a circular array. Each of a blades has a first pin extending from its top surface at or near the first end of the blade. Each of the blades also has a second pin extending from its bottom surface at or near the second end of the blade.

Both the series of iris diaphragm jaws and the multiple blade iris diaphragm are connected to a second ring within the mounting attachment. The second ring has a top surface and an opposite surface with its top surface facing the series of iris diaphragm jaws and its opposite surface racing the multiple blade iris diaphragm. The second ring defines holes therethrough or recesses therein each configured to receive a respective one of the first pins of the blades of the multiple blade iris diaphragm. The second ring further defines other holes therethrough or recesses therein each configured to receive a respective one of the second pins of the diaphragm jaws. The second ring also has at least one tab extending radially from its outer circumference. Preferably, the second ring has three or more tabs, or more preferably four tabs, extending radially outwardly from its outer circumference.

The mounting attachment also includes a cover The cover ring has a front face and a rear face opposite of the front face, and a circumferential cylindrical flange extending upwardly or outwardly from the front face at or near the circumference of the cover ring. The flange defines slots therethrough or slot-shaped recesses therein configured to receive the tabs extending from the second ring. Preferably, the slots through or slot-shaped recesses in the flange of the cover ring are each of an arc length from ten to thirty degrees from the center axis of the outer gear ring. In one advantageous embodiment, there are four slots through or slot-shaped recesses in the flange of the cover ring, with each slot or slot-shaped recess spaced apart from its adjacent slot or slot-shaped recess. The cover ring also defines holes or recesses its front face, with each of said holes or recesses configured to receive and of the second pins of the blades of the multiple blade iris diaphragm.

The iris diaphragm jaws, second ring and multiple blade iris diaphragm are held between the first ring and the cover ring, with the diaphragm jaws and multiple blade iris diaphragm within the space defined by the flange of the cover ring. The tabs of the second ring movably seat within the slots or slot-shaped recesses of the flange of the cover ring.

The iris diaphragm jaws, second ring and multiple blade iris diaphragm are covered by an outer gear ring. The outer gear ring surrounds the circumferential flange of the cover ring, and defines a center axis. The outer gear ring further defines one or more slots or recesses in its center axis-facing internal wall each of which is configured to receive one of the at least one tabs of the second ring. The outer gear ring is configured to rotate in a first direction about the center axis, such as clockwise or counterclockwise, and thereby to rotate the second ring in the first direction to open the iris diaphragm jaws to a first opening position and to open the multiple blade iris diaphragm to a first aperture size. The outer gear ring also is configured to rotate in a second direction about the center axis, such as counterclockwise or clockwise, and thereby to rotate the second ring in the second direction to close the iris diaphragm jaws to a second opening position different from the first opening position and to close the multiple blade iris diaphragm to a second aperture size different from first aperture size.

The position of the outer gear ring may be held by a lock lever. Preferably, the outer gear ring has ridges or gear teeth separated by grooves on at least a portion of its outer circumferential surface. Or, the ridges or gear teeth separated by grooves may be on its entire outer circumferential surface. The lock lever is joined to the first ring and the cover ring by a bar. For example, the first ring may have a radially outwardly extending tab configured to receive the bar of the lock lever, and the cover ring also may have a radially outwardly extending tab configured to receive the bar of the lock lever. The bar of the lock lever is connected to the tab of the first ring and the tab of the cover ring. The lock lever has a proximal end and a distal end, wherein the distal end defines a spool opening to receive the bar. The lock lever has on an exterior surface of the distal end a series of ridges configured to mate with the grooves of the outer gear ring when the lock lever is in locking configuration. The proximal end of the lock lever is rotatable about an axis defined by the bar to a first position to raise the series of ridges or the lock lever out of contact with the grooves of the outer gear ring, and to a second position to mate some of the ridges of the series of ridges with the grooves of the outer gear ring.

In one advantageous embodiment, surfaces of the iris diaphragm jaws have a dark, non-reflective surface, such as a matte black finish. In another advantageous embodiment, surfaces of the blades of the multiple blade iris diaphragm have a dark, non-reflective surface, such as a matte black finish.

In one advantageous embodiment, there are three iris diaphragm jaws in the series of iris diaphragm jaws and twelve blades in the multiple blade iris diaphragm.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings an embodiment of a variable diameter mounting attachment which is presently preferred. It should be understood, however, that the disclosure is not limited to the precise arrangements and instrumentalities shown. In the drawings.

DESCRIPTION OF THE DISCLOSURE

Figure 1:
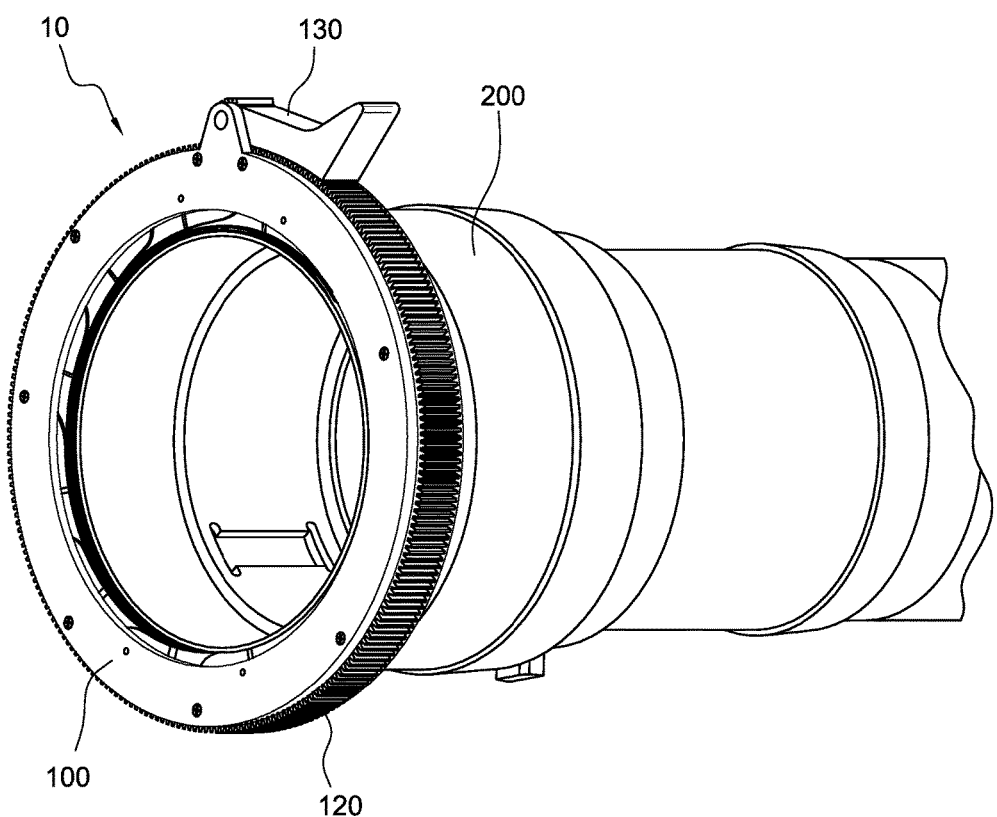
FIG. 1 is a right front perspective view of a variable diameter mounting attachment of the invention adjacent to a camera lens.

Certain terminology is used in the following description for convenience only and is not limiting. The words "lower," "bottom," "upper," "top," "right," and "left" designate directions in the drawings to which reference is made. The words "inwardly," "outwardly," "upwardly" and "downwardly" refer to directions toward and away from, respectively, the geometric center of the headrest, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include numerical parameter would include variations that, using mathematical and industrial principles accepted in the art (e.g., rounding, measurement other systematic errors, manufacturing tolerances, etc.), would not vary the least significant digit.

Figure 2:
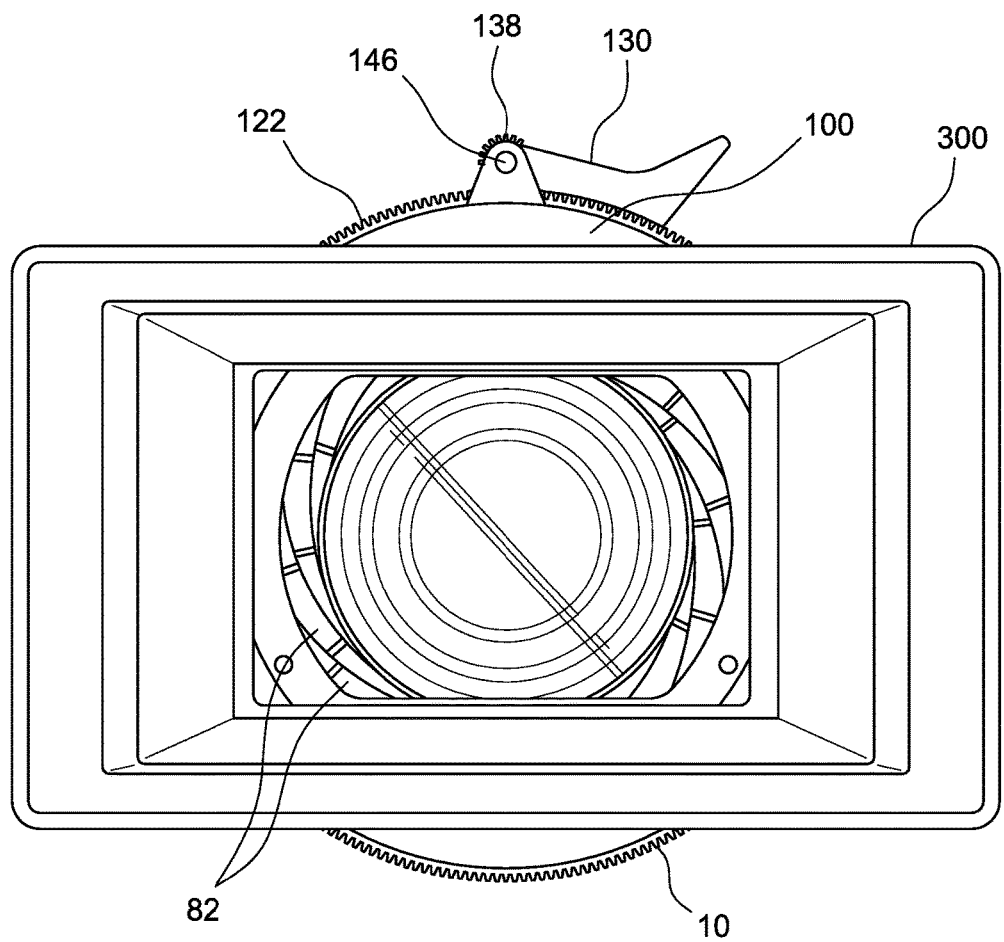
FIG. 2 is a front elevation view of a matte box joined to a camera lens with a variable diameter mounting attachment of the invention.

Referring to the drawings in detail, wherein like numerals indicate like elements throughout, there is shown in FIG. 1 a camera lens housing 200 to which a variable diameter mounting attachment 10 for a camera lens is about to be connected. In FIG. 2, the mounting attachment 10 is shown attached to the camera lens housing, with a made box 300 in turn connected to the mounting attachment 10 with dovetail connections using frames 400 and 410 and brackets 420, 430.

Referring to FIGS. 3A-9, the variable diameter mounting attachment 10 is shown in greater detail. A first ring 20 has a front surface 22 and a rear or opposite surface 24. The first ring defines holes therethrough or slots therein 26 that are spaced apart from one another and are radially outwardly directed. The first ring 20 of the embodiment shown in FIG. 8 has six holes 26 therethrough spaced apart by 60 degrees around the ring 20. A tab 28 extends radially outwardly from a circumferential edge of the first ring 20. The tab 28 defines a hole 30 therethrough. The hole 30 is configured to receive a bar 146 to which is mounted a lock lever 130.

A series of jaws 40 forming iris diaphragm jaws is provided adjacent the rear surface of the first ring 20. Each jaw 40 has a first end 44 and a second end 46 and is curved between the first end 44 and a second end 46. In the embodiment shown in FIGS. 1-9, each jaw 40 has a stepped top surface 42, with a first elevation at its first end 44 and a second elevation below the first elevation at its second end 46. The jaws 40 shown in FIG. 8 have three elevations, with a third elevation between the first elevation and second elevation at the middle of the curve. The jaws 40 are arranged in overlapping relation, with a rear surface of the first jaw in contact with the stepped top surface of an adjacent jaw. The jaws 40 are adapted for slidable movement with respect to one another, such as an iris diaphragm movement.

In the embodiment shown in FIGS. 1-9, the mounting attachment 10 includes three jaws 40. Any number of jaws greater than three also could be used. The more such jaws that are included will result in a stronger clamping function. As a possible disadvantage, adding additional jaws will increase the thickness and weight of the mounting attachment.

In one embodiment, the jaws 40 are formed of a rigid material, such as metal or carbon fiber-reinforced polymer. The jaws 40 optionally may be coated with a friction reducing coating, such as Teflon.

Figure 4:
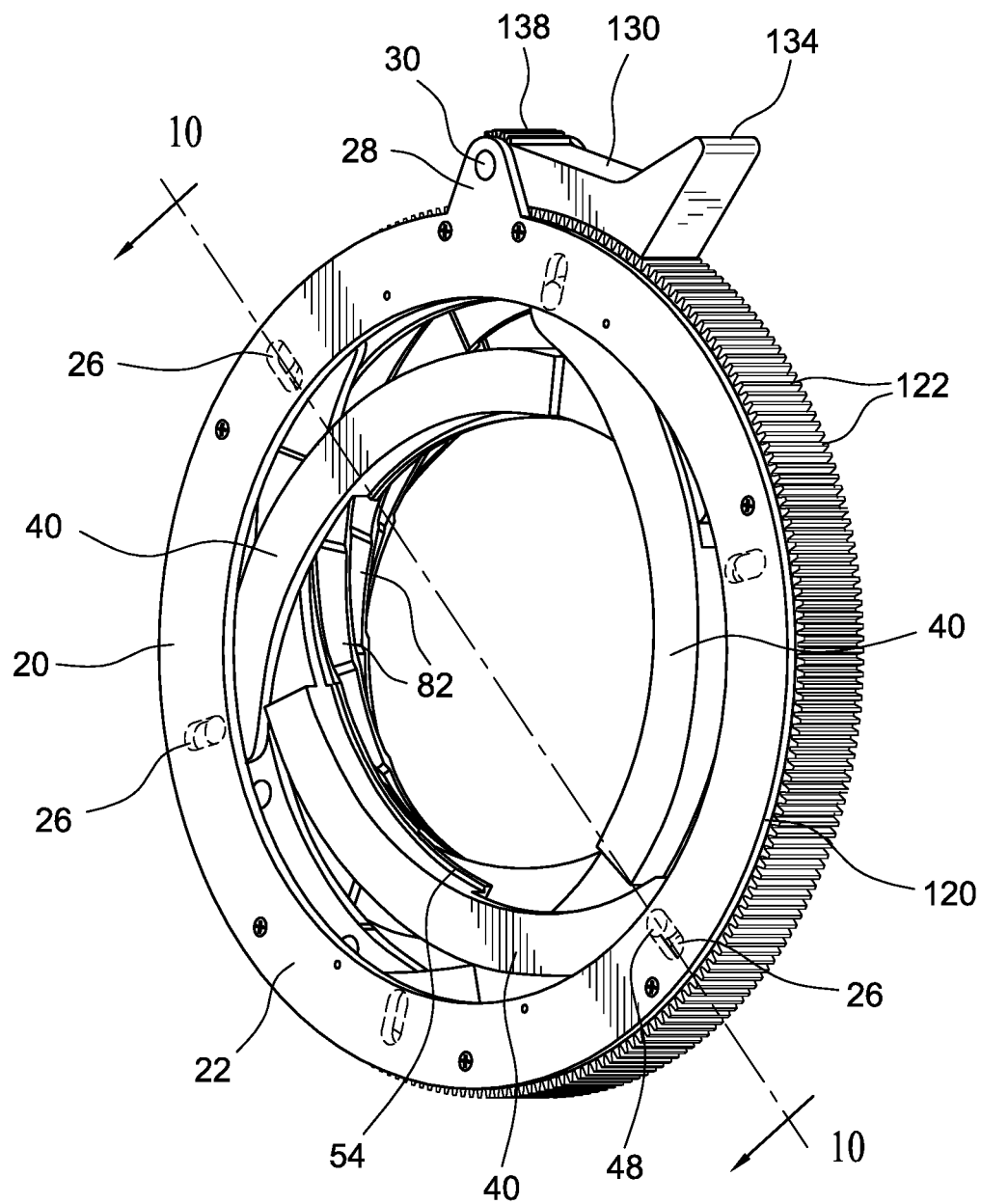
FIG. 4 is a right front perspective view of a variable diameter mounting attachment of the invention.
Figure 8:
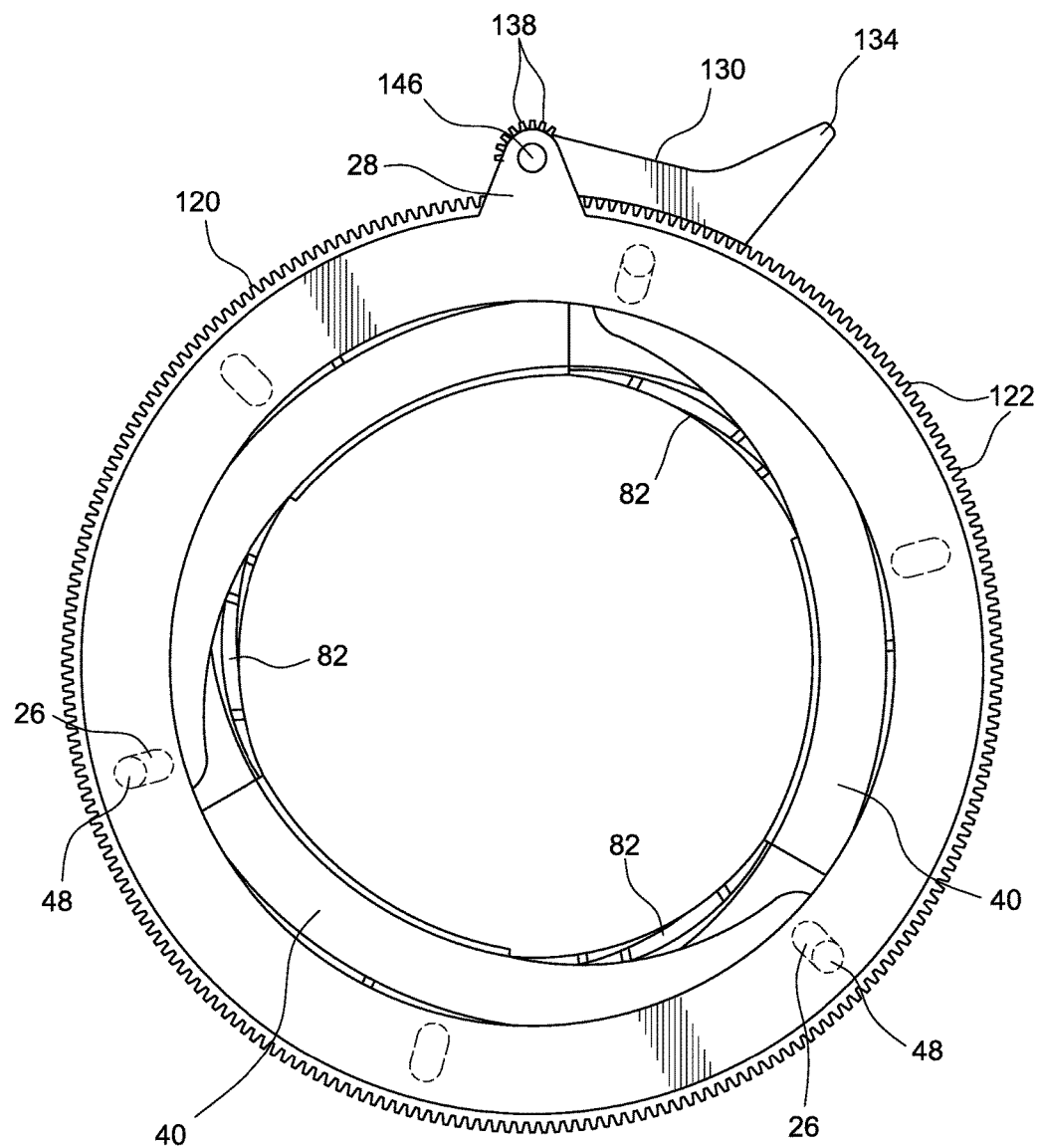
FIG. 8 is a front elevational view of the variable diameter mounting attachment of FIG. 7, showing the lock lever in closed position to maintain the jaws and iris blades in a closed position.
Figure 9:
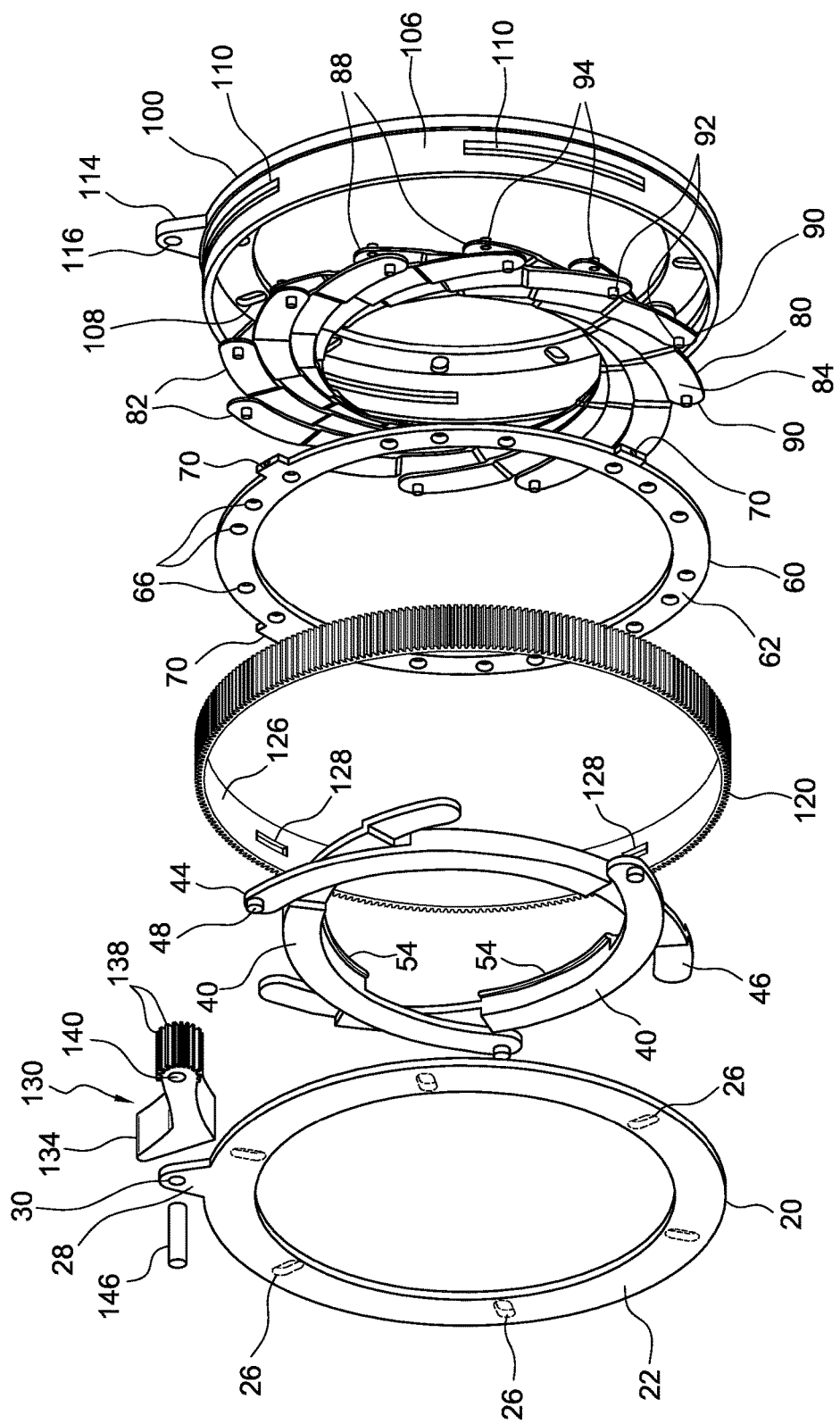
FIG. 9 is an exploded front perspective view of the structural components of the variable diameter mounting attachment of FIG. 4.
Figure 10:
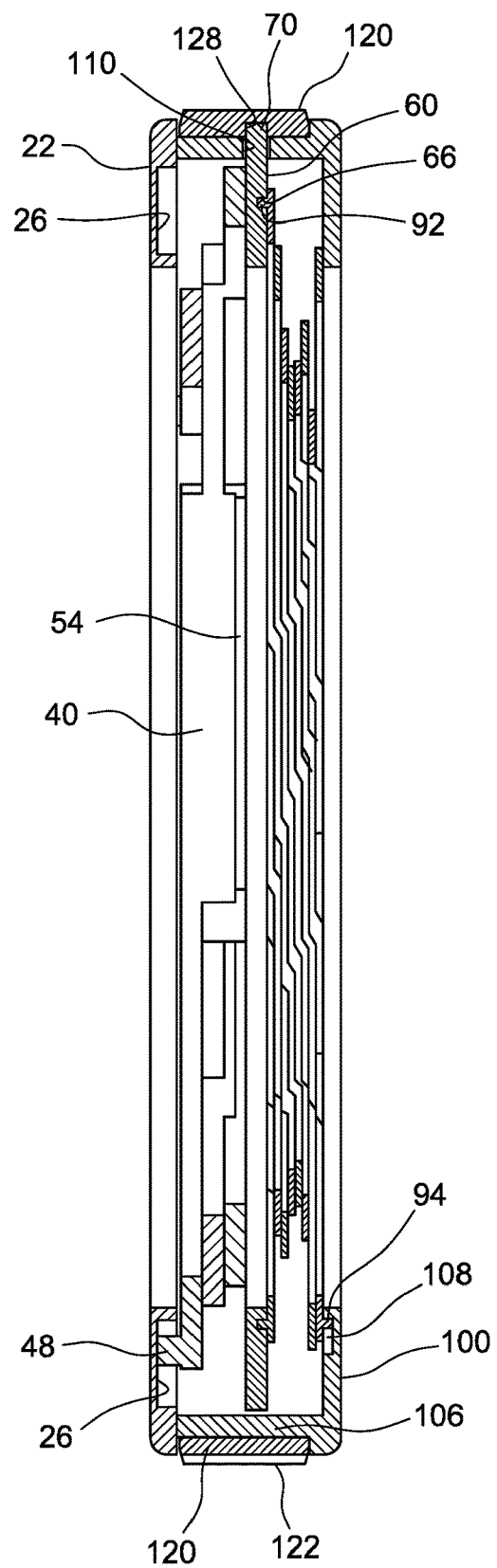
FIG. 10 is cross-sectional view taken along line 10-10 of FIG. 4.

The jaws 40 shown in FIGS. 4, 8 and 9 each have an inner raised rim 54 that is configured to grip to a portion of a groove or surface of an external housing 200 of a camera lens. In one embodiment, the rim 54 may comprise a gripping material, such as an elastomer, rubber, neoprene or polyurethane. The gripping material may be affixed to the jaws at the rim 54 forming the clamping surface.

Pins 48 extend from the top surface 42 near the first end 44 of each jaw 40. Pins 50 extend from the rear surface near the second end 46 of each jaw 40. Each pin 48 seats in a respective one of the holes or slots 26 in the first ring 20.

A second ring 60 is positioned adjacent the rear surface of the jaws 40. The second ring 60 has a top surface 62 and a bottom surface 64 opposite the top surface 62. The second ring 60 defines a series of holes 66 therethrough that are arranged in an array around the top surface 64 of the second ring 60. At least one tab 70 extends radially outwardly from the circumferential outer edge of the second ring 60. In the embodiment shown in FIGS. 1-9, the second ring 60 has four tabs 70, with the tabs spaced apart from one another. The spacing of the tabs 70 may be regular, e.g., located at 0 degrees, 90 degrees, 180 degrees, 270 degrees. The spacing of the tabs 70 alternatively may be at any desired orientation around the ring 60.

The pins 50 extending from the rear surface of each jaw 40 of the iris diaphragm jaws each seat within a respective one of the holes 66 in the second ring 60.

A multiple blade iris diaphragm 80 is positioned adjacent the bottom surface 64 of the second ring 60. The multiple blade iris diaphragm 80 has blades 82 arranged in a circular array. Each blade 82 has a top surface 84 and a bottom surface 86 opposite the top surface 84. Each blade 82 has a distal end 88 and a proximal end 80 and is curved along its length from its distal end 88 to its proximal end 90. Pins 92 extend from the top surface 84 of each blade 82 at or near its proximal end 90. Pins 94 extend from the bottom surface 86 of each blade 82 at or near its distal end 88. Pins 92 extending from the top surfaces 84 are adapted to fit in holes 66 in the second ring 60. Pins 94 extending from the bottom surfaces 86 are adapted to fit in holes or slots 108 in a cover ring 100. The blades 82 of the multiple blade iris diaphragm 80 are arranged overlapping relation in an array, such that a portion the bottom surface of one blade is in contact with the top surface of an adjacent blade. The array forms a circular opening defined by the inner curved side edges of the blades.

The blades 82 of the embodiment shown are fabricated of spring steel. Alternatively, they may comprise aluminum, carbon fiber reinforced polymer or durable plastics.

The blades 82 in this embodiment are coated or painted with a matte black finish. If the blades 82 comprise spring steel or other metal, they may be coated with black oxide or may be anodized. If the blades 82 comprise a rubber or polymeric material, a black pigment may be incorporated in the master batch. Optionally, the blades 82 may be coated with a friction reducing coating, such as Teflon.

In the embodiment shown FIGS. 1-9, the multiple blade iris diaphragm 80 has twelve blades 82. A number fewer or greater than twelve may be used, so long as there is a sufficient number of iris blades 82 to block unintended light from passing through to impinge on the camera lens. If the blades are made of softer material, such as a polymer, they may cup around the housing of the lens and form a more complete barrier to eliminate unintended light from passing through the attachment 10 to impinge on the camera lens.

A cover ring 100 is positioned adjacent to the bottom surfaces 86 of the blades 82 of the multiple blade iris diaphragm 80. The cover ring 80 has a back surface 102 and a front surface 104 opposite the back surface 102. A flange 106 extends upwardly or outwardly from the front surface 104 at or near the circumferential edge of cover ring 100. As shown in FIG. 8, the flange 106 is cylindrical, and defines holes or slots 110 therethrough or therein. The holes or slots 110 are spaced apart from one another around the flange 106. in the embodiment shown, the centers of the holes or slots 119 are spaced at intervals of about 90 degrees around the flange 106. The hole or slot length of the holes or slots 110 preferably is from about 10 degrees to about 30 degrees are from the center axis of the mounting attachment.

The cover ring 100 also defines holes or recesses 108 through or in its front surface 104. The recesses 108 in its front surface 104 are adapted to receive the pins 92 extending from bottom surfaces 86 of the blades 82 of the multiple blade iris diaphragm 80.

A radially extending tab 114 extends from the outer circumferential surface of the cover ring 100. The tab 114 has a hole 116 therethrough that is adapted to receive the bar 146 that joins the lock lever 130 to the cover ring 100.

An outer gear ring 120 is installed over the series of jaws 40 forming the iris diaphragm jaws, the second ring 60, the multiple blade iris diaphragm 80 and the flange 106 of the cover ring 100. The outer gear ring 120 has a knurled outer surface defining raised ribs or gear teeth separated by grooves to create gears 122 about its outer circumference. The outer gear ring 120 may have grooves and ribs (gear teeth) about its entire circumferential surface, or it may have sections thereof with such gears 122 and sections thereof without. The gear ring 120 has an inner surface 126 opposite from the outer surface with the gears 122. The inner surface 126 defines slots or recesses 128 adapted to receive the tabs 70 of the second ring 60. The tabs 70 are inserted through the slots 110 in the flange 106, and then into the recesses 128 the outer gear ring 120. Thus, the range of rotational movement of the second ring 60 is limited by the length of the slots 110 in the flange 106.

The outer gear ring 120 defines a center axis of the mounting attachment 10. The outer gear ring 120 may be rotated about its center axis in either clockwise or counter clockwise direction. Such rotation causes the second ring 60 to rotate with the outer gear ring 120, which in turn moves the pins 50, 92 of the jaws 40 and of the blades 80 that are within the holes 66 of the second ring 60. Such rotational movement causes the jaws 49 to slidably move in relation to one another, and causes the blades 82 to slidably move in relation to one another. This movement urges the jaws 40 to reduce the size of the aperture as defined by the inner rims 54 of the jaws 40, and urges the blades 82 to reduce the size of the aperture as defined by the inner edges of the blades 82.

Figure 5:
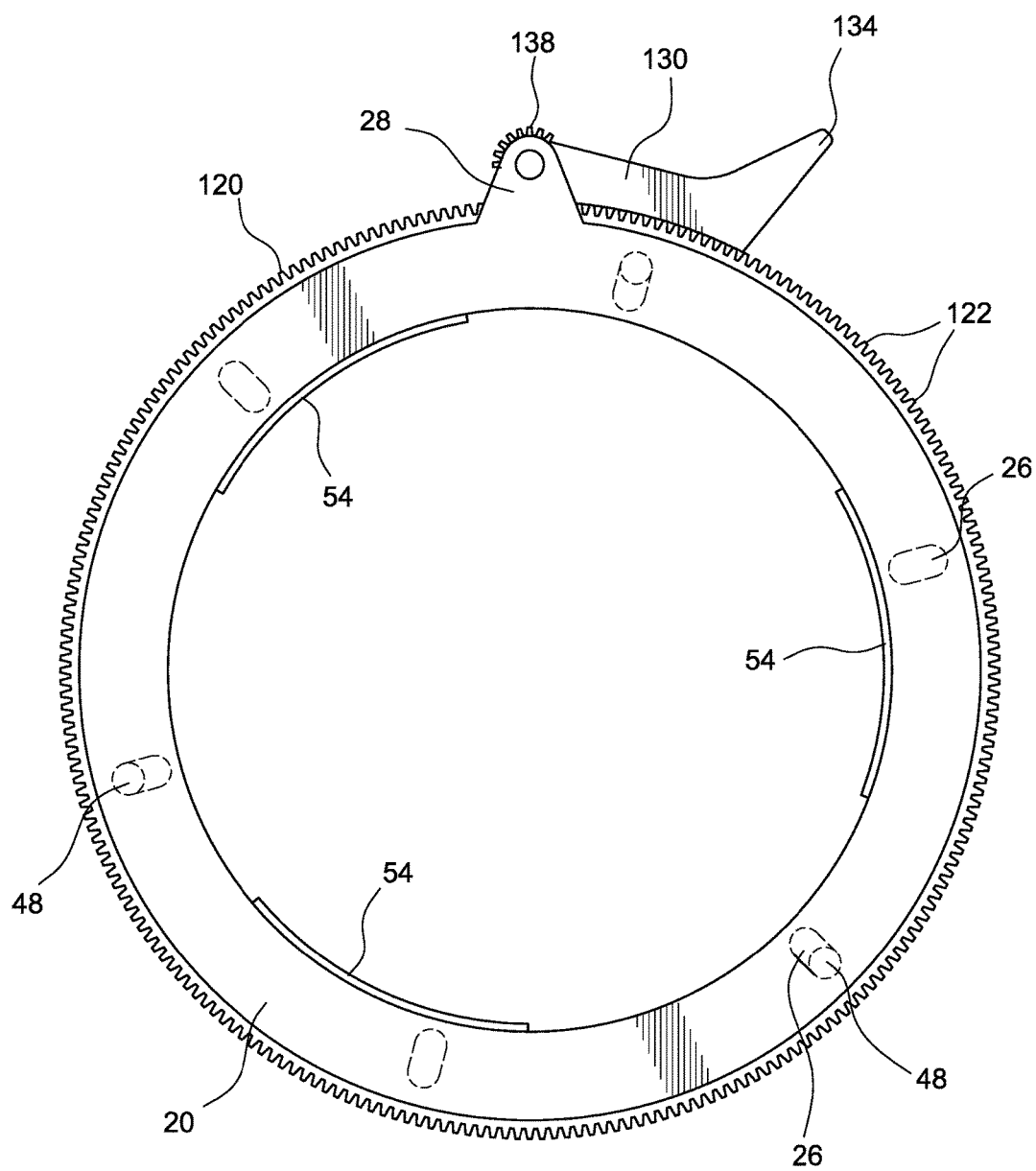
FIG. 5 is a front elevational view of the variable diameter mounting attachment FIG. 4, showing the lock lever in closed position with the jaws and iris blades in open position.
Figure 6:
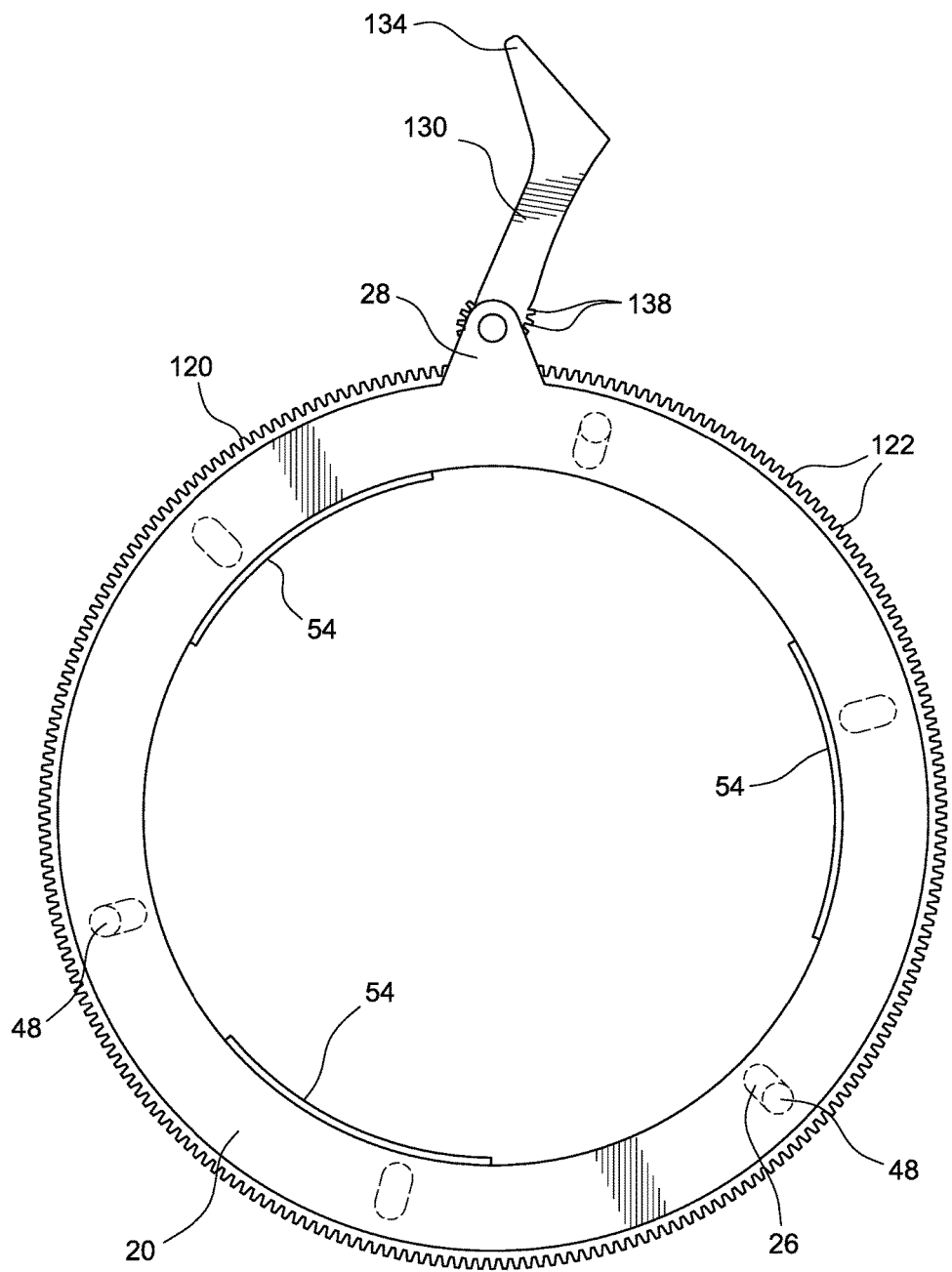
FIG. 6 is a front elevational view of the variable diameter mounting attachment of FIG. 4, showing the lock lever in released position.
Figure 7:
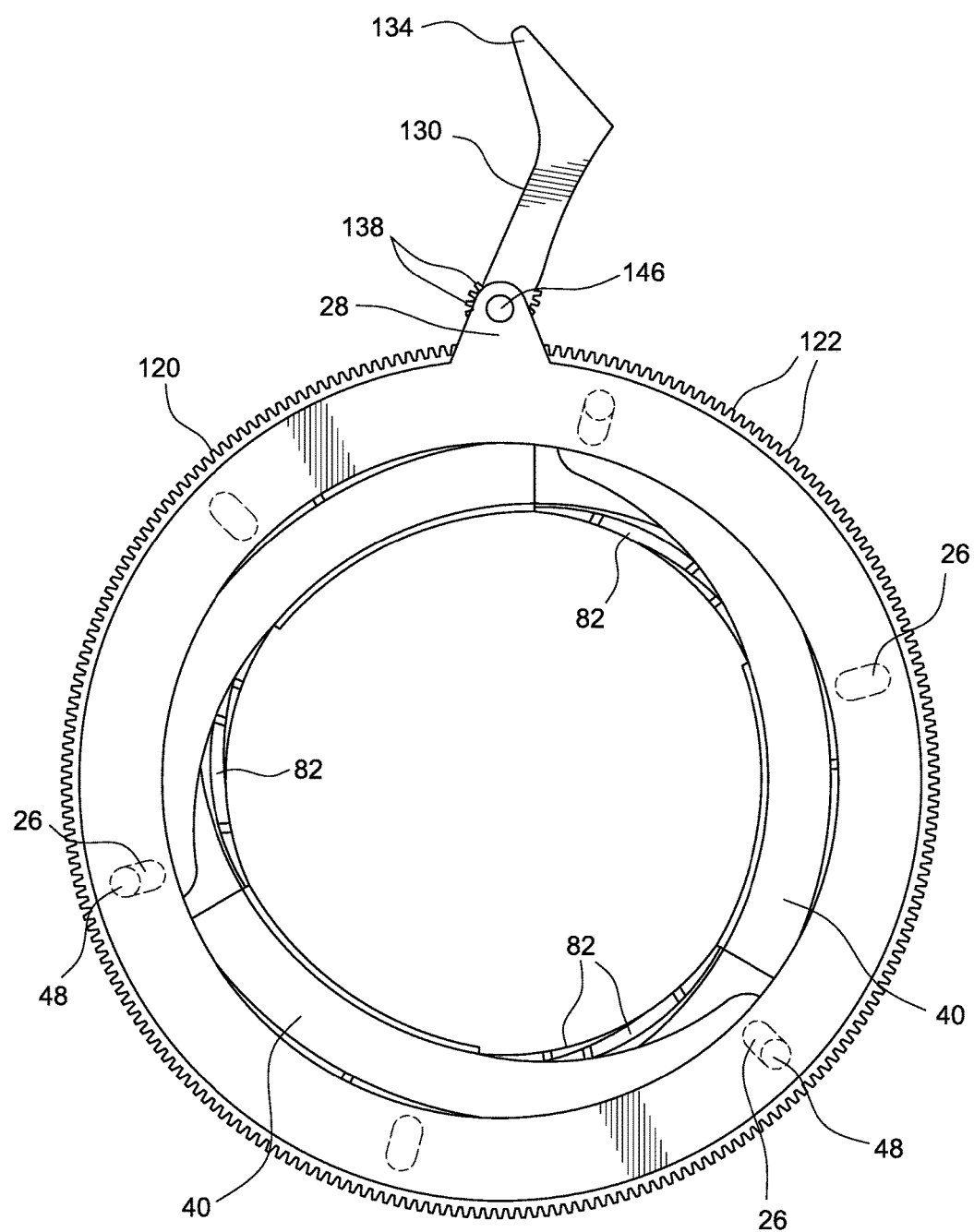
FIG. 7 is a front elevational view of the variable diameter mounting attachment of FIG. 4, showing the lock lever in released position and the outer ring rotated to begin closing the jaws and the iris blades.

The sequence of steps to secure the variable diameter mounting attachment 10 to a camera lens housing 200 is shown in FIGS. 4-7. First, FIG. 4 shows the variable diameter mounting attachment 10 in an open position, with the series of jaws 40 of the iris diaphragm and the multiple blades 82 of the multiple blade iris diaphragm 80 in retracted position in the mounting attachment 10. FIG. 5 shows the next step in the sequence in which the lock lever 130 is lifted by its handle 134 at its proximal end 132 to disengage the ridges 138 of the distal end 132 of the lock lever 130 from the gear teeth or grooves and channels 122 of the outer gear 129. With the lock lever 130 distal end 132 so disengaged, the outer gear ring 120 may be rotated about its center axis, such as clockwise, to cause the second ring 60 to rotate, which in turn causes the ends 46 of the jaws 40 and the ends 90 of the blades 82 that are joined to the ring 60 by joins 50, 92 to move, which urges the iris jaw diaphragm jaws 40 to move in relation to one another and the blades 82 of the multiple blade in diaphragm 80 to move in relation to one another. Such movement causes the aperture opening of the mounting attachment 10 to be reduced in size. See FIG. 6. With such movement, the inner raised rims 54 of the jaws 40 may grip a groove or surface of the camera lens housing 200 to secure the mounting attachment 10 thereto. And, the multiple blade iris diaphragm 80 may close to an aperture opening, size comparable to the aperture opening of the jaws 40, so as to block stray light from the sides of the mounting attachment 10 from impinging on the camera lens. Referring to FIG. 7, the lock lever 130 then is rotated to its closed position so that the gear ridges 138 at its distal end 136 again mate with the gear teeth grooves 122 of the outer gear ring 120. With the lock Lever 130 so engaged, the respective orientation of the jaws 40 of the iris diaphragm jaws and the blades 82 of the multiple blade iris diaphragm 80 may be maintained. The dowel/bar 146 is in an eccentric position so that the gear ridges 138 of the lock lever 130 are free of the gear teeth grooves 122 when the lever lock 130 is in the unlocked position, and the gear ridges 138 engage with the gear teeth grooves 122 when the lock lever 130 is in the second or locked position.

Figure 3A:
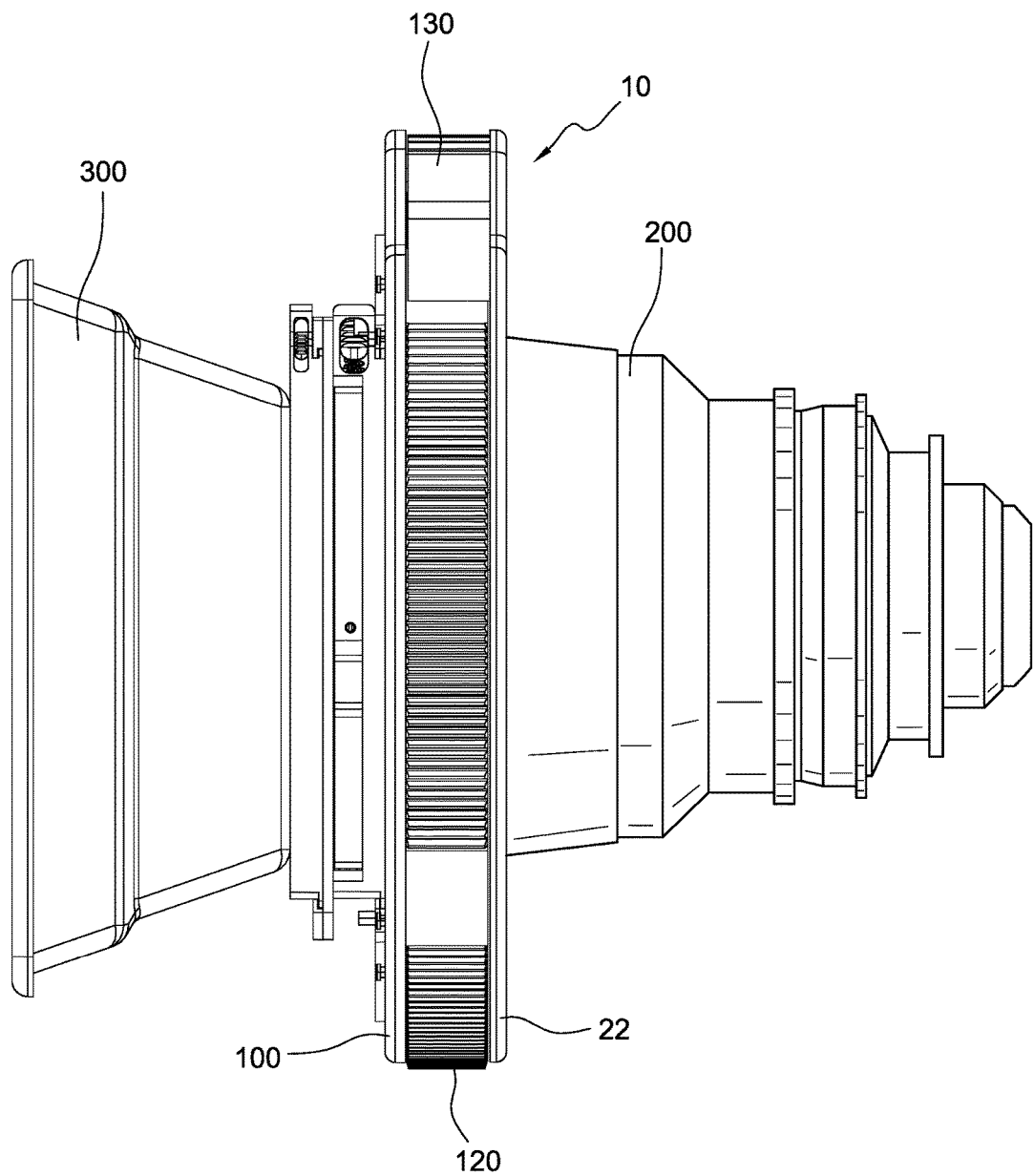
FIG. 3A is a right side elevation view of the matte box joined to a camera with a variable diameter mounting attachment of FIG. 2.
Figure 3B:
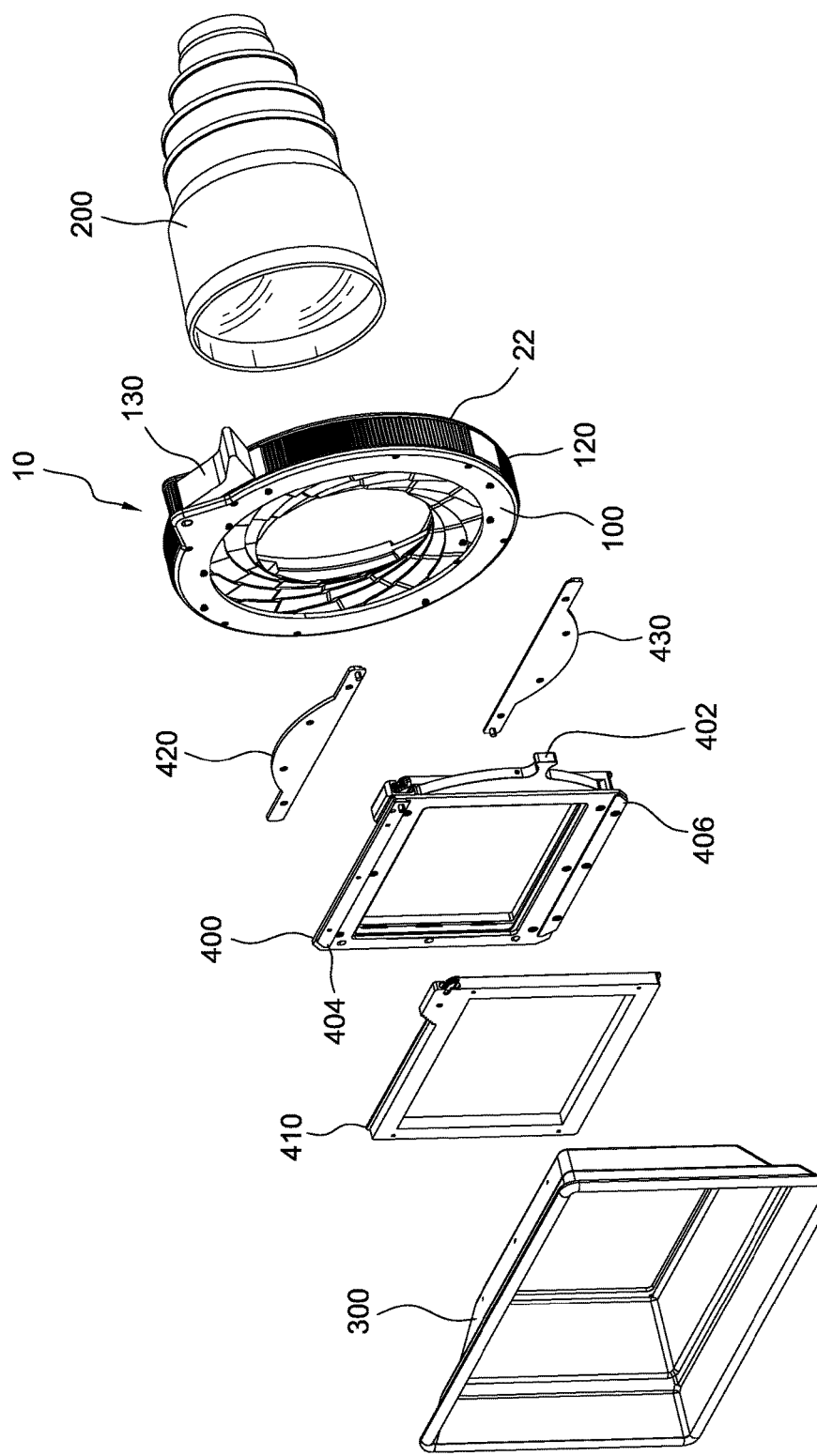
FIG. 3B is an exploded view of the matte box, variable diameter mounting attachment and camera lens or FIG. 3A.

A matte box 300 or other desired camera attachment may in turn be joined to the mounting attachment 10, such as by dovetail connection. Referring to FIG. 3B, brackets 420, 430 are joined with fasteners to the surface of the cover ring 100 in spaced apart locations to establish a channel pathway for a dovetail connection with first frame 400. The first frame 400 slidably joined to the brackets 420, 430. A pull knob 402 is associated with the first frame 400. The first frame 400 also has projecting surfaces 404, 406 from its front face at or near the top frame edge and the bottom frame edge. A second frame 410 is slidably joined to the first frame 400 by a separate dovetail connection with the projecting surfaces 404, 406. The matte box 300 is joined to the second frame 410.

To release the mounting attachment 10 from the camera lens housing 200, the lever lock 130 is lifted by handle 134 to rotate the lever lock 130 so that the gear ridges 138 at its distal end are lifted out of contact with the gear teeth 122 of the outer gear ring 120. The outer gear ring 120 may then be rotated about its center axis in a counter clockwise direction and thereby rotate the second ring 60 that moves the pins 50, 92 that are engaged with the second ring 60. By such counter clockwise movement, the jaws 40 are moved in relation to one another to open the aperture opening size of the iris diaphragm jaws so that the inner rims 54 may be disengaged from the camera lens housing 200. Concurrently, by counter clockwise movement of the second ring 60, blades 80 are moved in relation to one another to increase the aperture opening of the multiple blade iris diaphragm. With the aperture openings of the iris diaphragm blades and multiple blade iris diaphragm enlarged, the mounting attachment may be disengaged from the camera lens housing 200.

Attachment to and disengagement from a camera lens housing thus is accomplished without need for separately sized mounting plates or other adapters, and without need for tools or other fasteners.

As an alternative construction, the jaws need not be the curved iris diaphragm jaws 40 disposed in overlapping as shown FIGS. 1-9 but instead may straight edged panels or jaws that move radially toward or away from the camera lens housing in response to movement of the second ring 60. In such alternative embodiment, at least three such panels are spaced apart radially. Or an alternative to the curved iris diaphragm jaws, may be structure comparable to a drill bit chuck that opens and closes in response to movement of the second ring 60 to hold the variable diameter mounting attachment to the camera lens housing 200.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A mounting attachment for a camera lens, comprising:
   a series of two or more iris diaphragm jaws having a curved shape with a first end and a second end and a top surface and a bottom surface opposite the top surface, said diaphragm jaws arranged in overlapping relation to form a circular array, each diaphragm jaw having a first pin extending from its top surface at or near the first end of the diaphragm jaw and having a second pin extending from its opposite surface at or near the second end;
   a first ring having a top surface and an opposite surface, with its top surface adjacent at least a portion of the top surfaces of the iris diaphragm jaws, and defining holes therethrough or recesses therein each configured to receive a respective one of the first pins of the diaphragm jaws;
   a multiple blade iris diaphragm wherein each of the blades has a curved shape with a first end and a second end and a top surface and an opposite surface and the blades are arranged in overlapping relation to form a circular array, wherein each of the blades has a first pin extending from its top surface at or near the first end of the blade, and wherein each of the blades has a second pin extending from its bottom surface at or near the second end of the blade;
   a second ring having a top surface and an opposite surface, with its top surface facing the series of iris diaphragm jaws and its opposite surface facing the multiple blade iris diaphragm, said second ring defining holes therethrough or recesses therein each configured to receive a respective one of the first pins of the blades of the multiple blade iris diaphragm, and said second ring defining other holes therethrough or recesses therein each configured to receive a respective one of the second pins of the diaphragm jaws, said second ring having at least one tab extending radially from its outer circumference;

a cover ring having a front face and a rear face opposite of the front face, said cover ring having a circumferential flange extending upwardly from the front face, said flange defining slots therethrough or slot-shaped recesses therein configured to receive the tabs extending from the second ring, said cover ring defining holes or recesses in its front face with each of said holes or recesses configured to receive one of the second pins of the blades of the multiple blade iris diaphragm; and an outer gear surrounding the circumferential flange of the cover ring, said outer gear ring defining a center axis, said outer gear ring defining one or more slots or recesses in its center axis-facing internal wall each of which is configured to receive one of the at least one tabs of the second ring, said outer gear ring configured to rotate in a first direction about the center axis and thereby to rotate the second ring in the first direction to open the iris diaphragm jaws to a first opening position and to open the multiple blade iris diaphragm to a first aperture size, said outer gear ring further configured to rotate in a second direction about the center axis and thereby to rotate the second ring in the second direction to close the iris diaphragm jaws to a second opening position different from the first opening position and to close the multiple blade iris diaphragm to a second aperture size different from the first aperture size.

2. The mounting attachment for a camera lens of claim 1, wherein the outer gear ring has ridges separated by grooves on at least a portion of its outer circumferential surface.

3. The mounting attachment for a camera lens of claim 1, wherein the outer gear ring has ridges separated by grooves on its entire outer circumferential surface.

4. The mounting attachment for a camera lens of claim 1, wherein each of the iris diaphragm jaws have an inner curved edge with a raised rim configured to seat in a groove on an external circumferential surface of a housing of the camera lens.

5. The mounting attachment for a camera lens of claim 4, wherein the raised rim comprises an elastomeric material.

6. The mounting attachment for a camera lens of claim 1, wherein the top surfaces of the iris diaphragm jaws are stepped, and a portion of the bottom surface of a first iris diaphragm jaw slidably contacts a portion of the stepped top surface of a second iris diaphragm jaw.

7. The mounting attachment for a camera lens of claim 1, wherein at least the top surfaces and opposite surfaces of the iris diaphragm jaws are fabricated of a material that incorporates a friction reducing composition or are coated with a friction reducing composition.

8. The mounting attachment for a camera lens of claim 1, further comprising a lock lever.

9. The mounting attachment for a camera lens of claim 8, wherein said first ring further has a radially outwardly extending tab configured to receive a bar of lock lever, and said cover ring further has a radially outwardly extending tab configured to receive the bar of the lock lever.

10. The mounting attachment for a camera lens of claim 9, wherein the bar of the lock lever is connected to the tab of the first ring and the tab of the cover ring.

11. The mounting attachment for a camera lens of claim 2, further comprising a lock lever, wherein the lock lever has a proximal end and a distal end, wherein the distal end defines a spool opening to receive a bar that is connected to a radially outwardly extending tab of said first ring and to a radially outwardly extending tab of the cover ring, and wherein the lock lever has on an exterior surface of the distal end a series of ridges configured to mate with the grooves of the outer gear ring when the lock lever is in locking configuration.

12. The mounting attachment for a camera lens of claim 11, wherein the proximal end of the lock lever is rotatable about an axis defined by the bar to a first position to raise the series of ridges of the lock lever out of contact with the grooves of the outer gear ring, and to a second position to mate some of the ridges of the series of ridges with the grooves of the outer gear ring.

13. The mounting attachment for a camera lens of claim 1, wherein the slots through or slot-shaped recesses in the flange of the cover ring are of an arc length of from ten to thirty degrees from the center axis of the outer gear ring.

14. The mounting attachment for a camera lens of claim 13, wherein there are four slots through or slot-shaped recesses in the flange of the cover ring, with each slot or slot-shaped recess spaced apart from its adjacent slot or slot-shaped recess.

15. The mounting attachment for a camera lens of claim 1, wherein surfaces of the iris diaphragm jaws have a matte black finish or other dark, non-reflective finish.

16. The mounting attachment for a camera lens of claim 1, wherein surfaces of the blades of the multiple blade iris diaphragm have a matte black finish, or other dark, non-reflective finish.

17. The mounting attachment for a camera lens of claim 1, wherein the series of ins diaphragm jaws comprises three iris diaphragm jaws.

18. The mounting attachment for a camera lens of claim 1, wherein the multiple blade iris diaphragm comprises twelve blades.

19. A mounting attachment for a camera lens, comprising:
a series of three or more jaws with a first end and a second end and a top surface and a bottom surface opposite the top surface, said jaws arranged in a circular array, each jaw having a first pin extending from its top surface at or near the first end of the jaw and having a second pin extending from its opposite surface at or near the second end;
a first ring having a top surface and an opposite surface, with its top surface adjacent at least a portion of the jaws, and defining holes therethrough or recesses therein each configured to receive a respective one of the first pins of the jaws;
a multiple blade iris diaphragm wherein each of the blades has a curved shape with a first end and a second end and a top surface and an opposite surface and the blades are arranged in overlapping relation to form a circular array, wherein each of the blades has a first pin extending from its top surface at or near the first end of the blade, and wherein each of the blades has a second pin extending from its bottom surface at or near the second end of the blade;
a second ring having a top surface and an opposite surface, with its top surface facing the series of jaws and its opposite surface facing the multiple blade iris diaphragm, said second ring defining holes therethrough or recesses therein each configured to receive a respective one of the first pins of the blades the multiple blade iris diaphragm, and said second ring defining other holes therethrough or recesses therein each configured to receive a respective one of the second pins of the jaws, said second ring having at least one tab extending radially from its outer circumference;

a cover ring having a front face and a rear face opposite of the front face, said cover ring having a circumferential flange extending upwardly from the front face, said flange defining slots therethrough or slot-shaped recesses therein configured to receive the tabs extending from the second ring, said cover ring defining holes or recesses in its front face with each of said holes or recesses configured to receive one of the second pins of the blades of the multiple blade iris diaphragm; and an outer gear ring surrounding the circumferential flange of the cover ring, said outer gear ring defining a center axis, said outer gear ring defining one or more slots or recesses its center axis-facing internal wall each of which is configured to receive one of the at least one tabs of the second ring, said outer gear ring configured to rotate in a first direction about the center axis and thereby to rotate the second ring in the first direction to open the jaws to a first opening position and to open the multiple blade iris diaphragm to a first aperture size, said outer gear ring further configured to rotate in a second direction about the center axis and thereby to rotate the second ring in the second direction to close the jaws to a second opening position different from the first opening position and to close the multiple blade iris diaphragm to a second aperture size different from the first aperture size.

20. The mounting attachment for a camera lens of claim 19, wherein each of the jaws have an inner straight edge with a raised rim configured to seat in a groove on an external circumferential surface of a housing of the camera lens.

21. The mounting attachment for a camera lens of claim 20, wherein the raised rim comprises an elastomeric material.

22. The mounting attachment for a camera lens wherein claim 19, wherein the outer gear ring has ridges separated by grooves on at least a portion of its outer circumferential surface.

23. The mounting attachment for a camera lens of claim 22, further comprising a lock lever, wherein the lock lever has a proximal end and a distal end, wherein the distal end defines a spool opening to receive a bar that is connected to a radially outwardly extending tab of said first ring and to a radially outwardly extending tab of the cover ring, and wherein the lock lever has on an exterior surface of the distal end a series of ridges configured to mate with the grooves of the outer gear ring when the lock lever is in locking configuration.

24. The mounting attachment for a camera lens of claim 23, wherein the proximal end of the lock lever is rotatable about an axis defined by the bar to a first position to raise the series of ridges of the lock lever out of contact with the grooves of the outer gear ring, and to a second position to mate some of the ridges of the series of ridges with the grooves of the outer gear ring.

* * * * *